(No Model.) 8 Sheets—Sheet 3.

W. ALEXANDER & W. E. THOMPSON.
COIN CONTROLLED GASOMETER.

No. 526,138. Patented Sept. 18, 1894.

Witnesses
J. B. Paige
F. C. Ewing

Inventors
William Alexander
William Edward Thompson
By Clarence P. Ludgen
Attorney (No Model.) 8 Sheets—Sheet 4.

W. ALEXANDER & W. E. THOMPSON.
COIN CONTROLLED GASOMETER.

No. 526,138. Patented Sept. 18, 1894.

Witnesses
Inventors (No Model.) 8 Sheets—Sheet 5.

W. ALEXANDER & W. E. THOMPSON.
COIN CONTROLLED GASOMETER.

No. 526,138. Patented Sept. 18, 1894.

Witnesses
J. B. Raign
F. C. Ewing

Inventors
William Alexander
William Edward Thompson
By Clarence F. Rodgers
as Attorney (No Model.) 8 Sheets—Sheet 6.

W. ALEXANDER & W. E. THOMPSON.
COIN CONTROLLED GASOMETER.

No. 526,138. Patented Sept. 18, 1894.

Witnesses

Inventors (No Model.) 8 Sheets—Sheet 7.

W. ALEXANDER & W. E. THOMPSON.
COIN CONTROLLED GASOMETER.

No. 526,138. Patented Sept. 18, 1894.

Witnesses   Inventors
J. B. Paige   William Alexander
F. C. Ewing   William Edward Thompson
 By Clarence Paige as Attorney (No Model.) 8 Sheets—Sheet 8.

W. ALEXANDER & W. E. THOMPSON.
COIN CONTROLLED GASOMETER.

No. 526,138. Patented Sept. 18, 1894.

Witnesses
Inventors
William Alexander
William Edward Thompson
By Clarence Paige
as Attorney

UNITED STATES PATENT OFFICE.

WILLIAM ALEXANDER, OF BIRKENHEAD, AND WILLIAM EDWARD THOMPSON, OF LIVERPOOL, ENGLAND.

COIN-CONTROLLED GASOMETER.

SPECIFICATION forming part of Letters Patent No. 526,138, dated September 18, 1894.

Application filed March 10, 1894. Serial No. 503,112. (No model.) Patented in England March 18, 1893, No. 5,830.

*To all whom it may concern:*

Be it known that we, WILLIAM ALEXANDER, of Birkenhead, in the county of Chester, and WILLIAM EDWARD THOMPSON, of Liverpool, in the county of Lancaster, in the Kingdom of England, subjects of the Queen of Great Britain, have invented certain new and useful Improvements in Coin-Actuated Mechanism, (for which we have received Letters Patent in England, No. 5,830, dated March 18, 1893,) of which the following is a specification.

This invention has for its object certain improvements in coin freed or coin actuated mechanism for regulating or controlling the supply of anything sold by measure, but specially adapted to machines for the sale or measurement of liquids or fluids such as gas, water, electricity, &c.

The accompanying drawings show the application of our improved mechanism to gas meters, and as such it will be hereinafter described, but it must be clearly understood that our invention is not confined to this, as it can be adapted to any meter or measuring appliance, for example, in the case of electricity, in place of a cut off valve there would be a switch.

Figures 1 to 8 on the drawings depict our improved coin freed or actuated mechanism attached to a wet gas meter, Fig. 1 being a front elevation, partly in section; Figs. 9 to 15 show a modification specially adapted to dry meters, Fig. 9 being a front elevation; Fig. 10, a plan.

Figure 1:
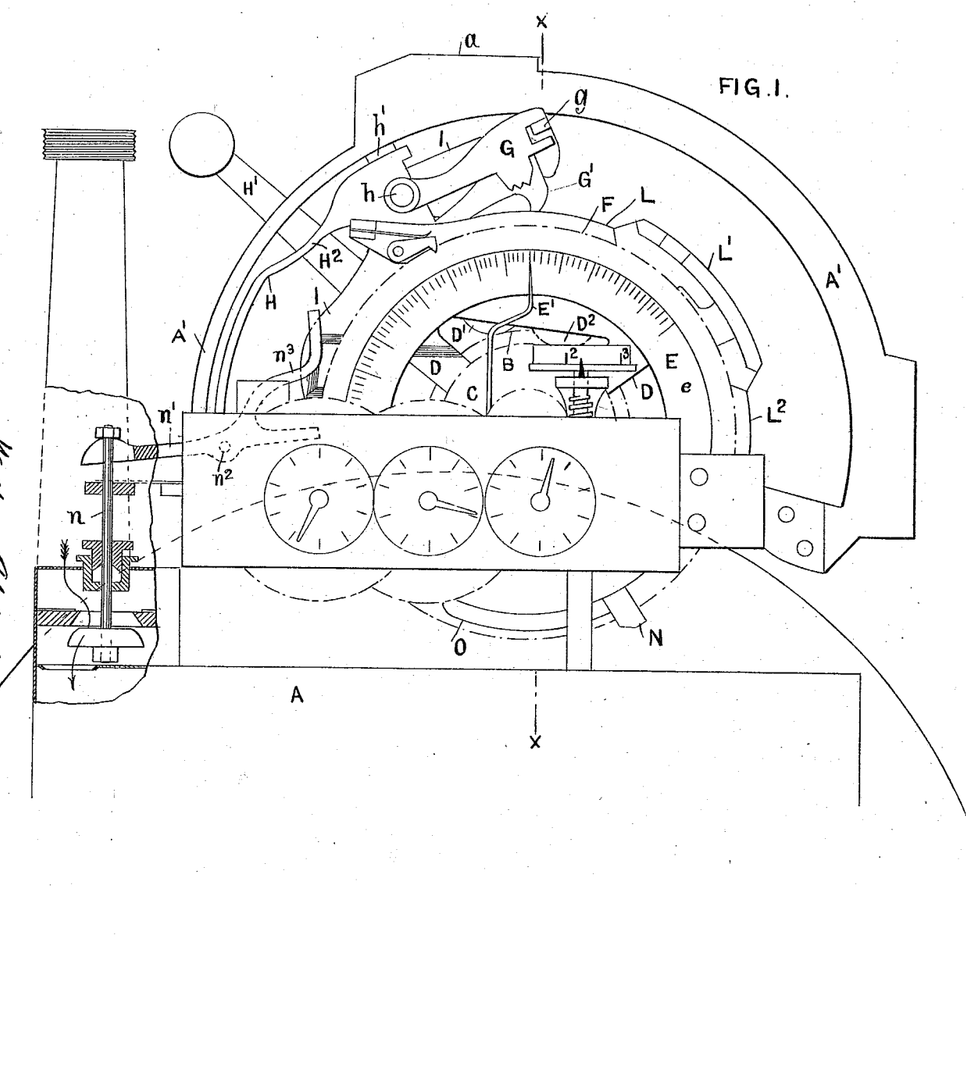
Figure 2:
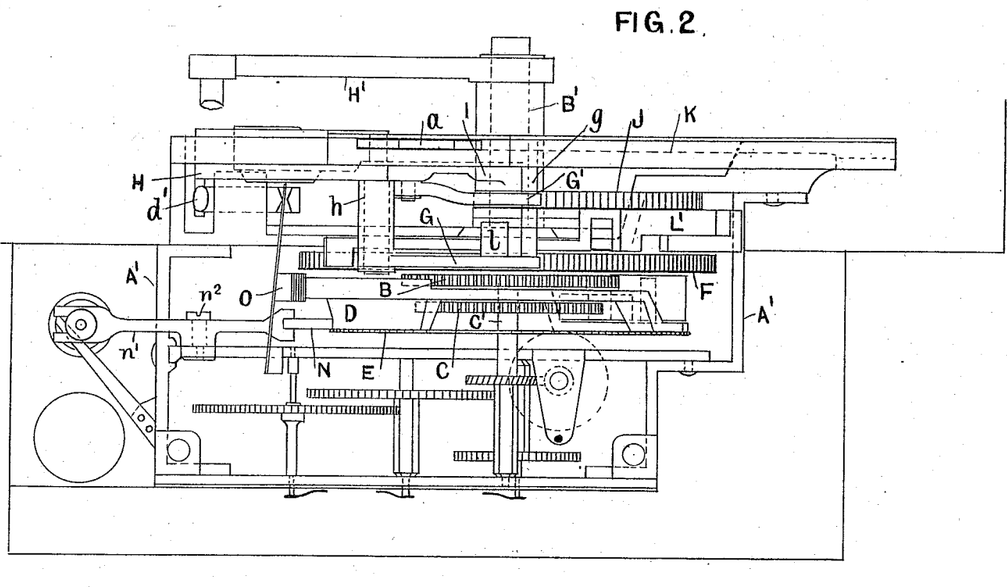
Fig. 2, a plan.
Figure 3:
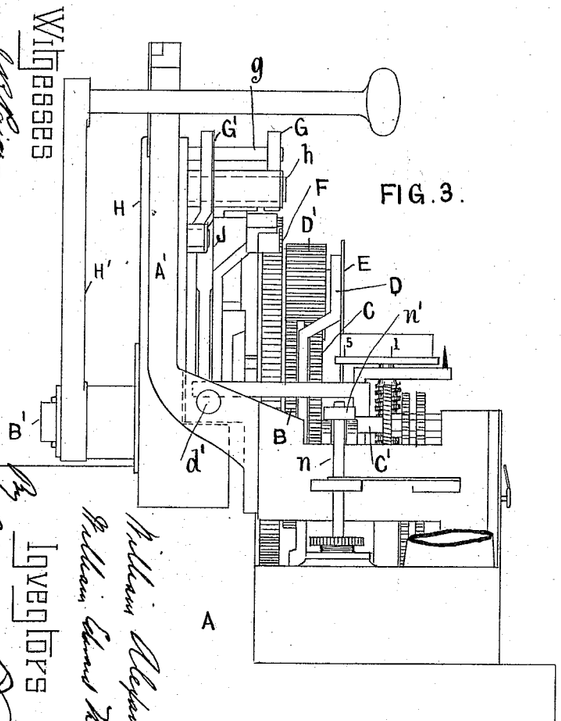
Fig. 3, a side elevation.
Figure 4:
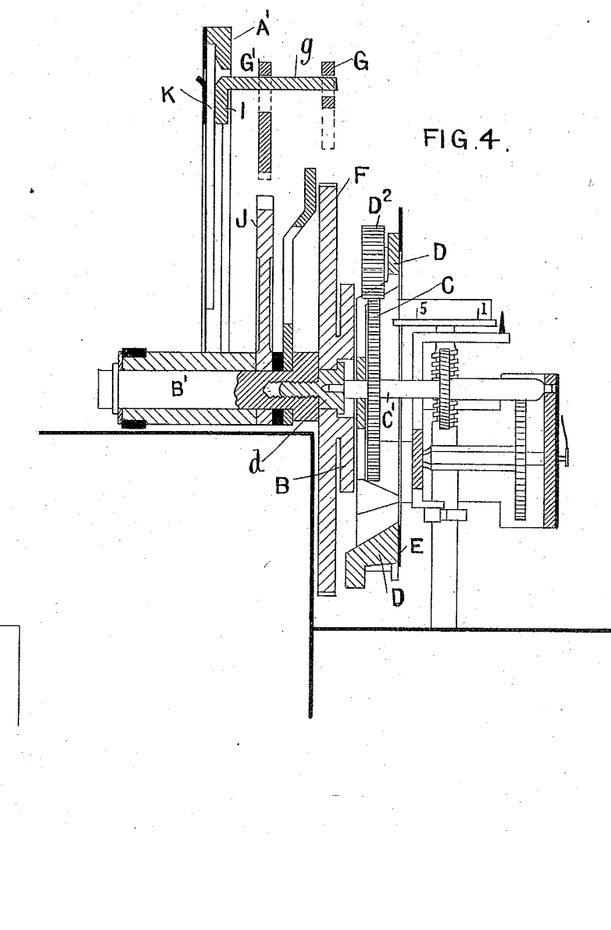
Fig. 4, a section through $x$ $x$, Fig. 1.

Referring first to Figs. 1 to 3:—A is a portion of a meter with the mechanism in position. A' is a frame carrying or supporting the latter and having a coin slot $a$ and guideway formed therein for purposes hereinafter described.

B and C are two concentric toothed wheels, the one, B, being loosely mounted on a projection or stud $d$, and the other, C, fixed on a rotatable spindle C' which is driven by the ordinary index gearing of the meter. Between these wheels B and C is a frame D, loosely mounted on the spindle C' and carrying, in addition to two rolling wheels D' and $D^2$, an index or dial E in the form of a ring, which has divisions marked on its face inversely to the usual manner, for the purpose of showing at any time the quantity of gas paid for but not consumed. E' is a fixed pointer in front of the dial E. The aforementioned rolling wheels D' $D^2$ gear, one with the toothed wheel B, and the other with the wheel C, and with each other, so that the dial or index E is rotated in one direction when a coin is inserted, in a manner hereinafter described, and in the reverse direction by means of the index gearing from the drum or bellows of the meter. This epicyclic gear is an important feature of this invention, as it dispenses with the frictional arrangement employed for this purpose in some prepayment gas meters and which is so uncertain in its action. We do not, however, confine ourselves to the exact arrangement of rolling wheels above described, as the same object can be obtained by means of an epicyclic train of any form. For instance, the concentric and rolling wheels may be arranged either with one of the concentric wheels, having teeth on its outer edge, placed inside of the other, which is of a larger diameter and has teeth on the inner edge of its rim, the rolling wheels being placed in the space between them and gearing into both the inner and outer wheels; or the concentric wheels may be in the form of crown or beveled wheels of the same diameter placed parallel to and facing each other with the rolling wheels between them and gearing into both of them.

F is a ratchet wheel loosely mounted on the projection or stud $d$, which is screwed into the aforementioned spindle B' and formed in one with the toothed wheel B.

Figure 5:
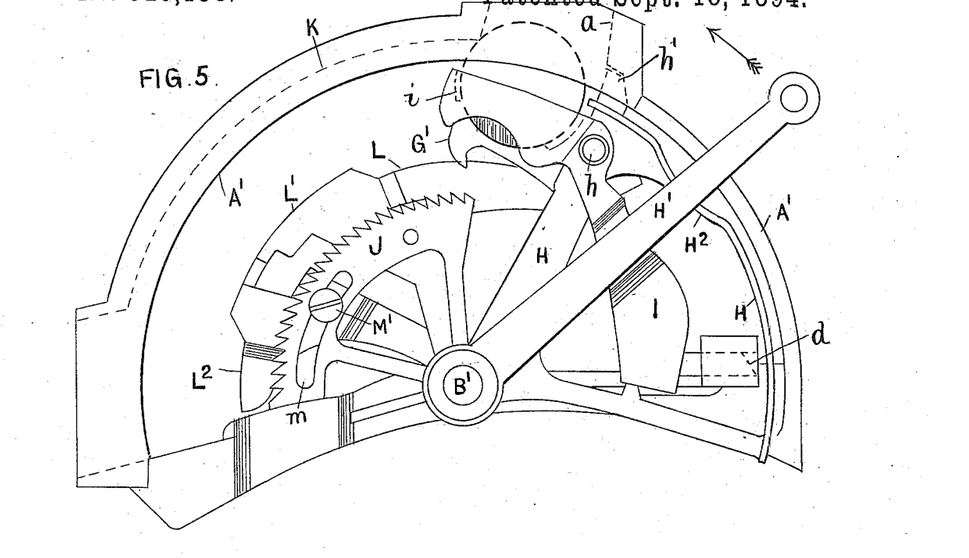
Fig. 5, a back elevation.
Figure 6:
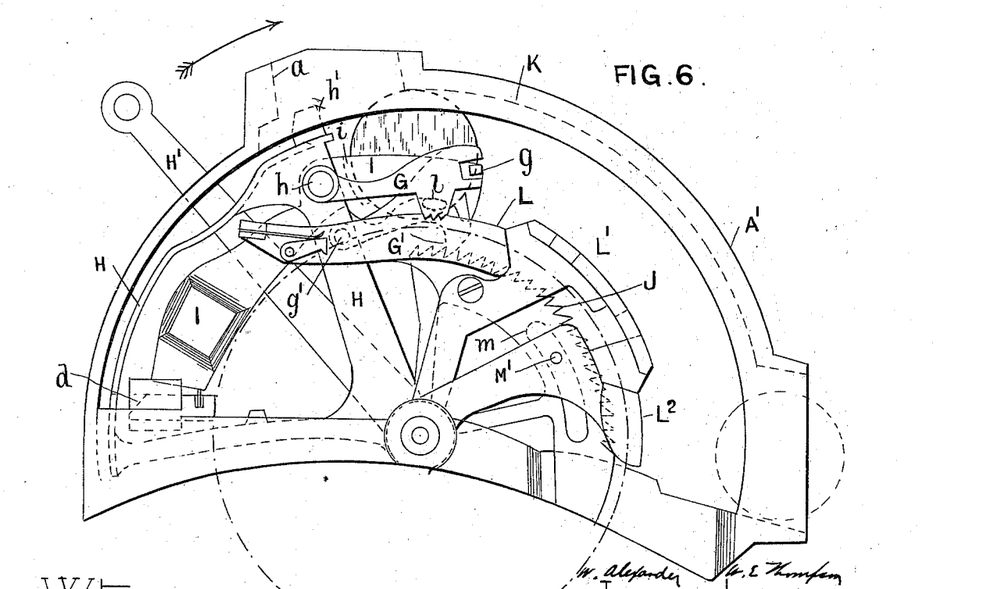
Fig. 6, a front elevation with the index removed.
Figure 7:
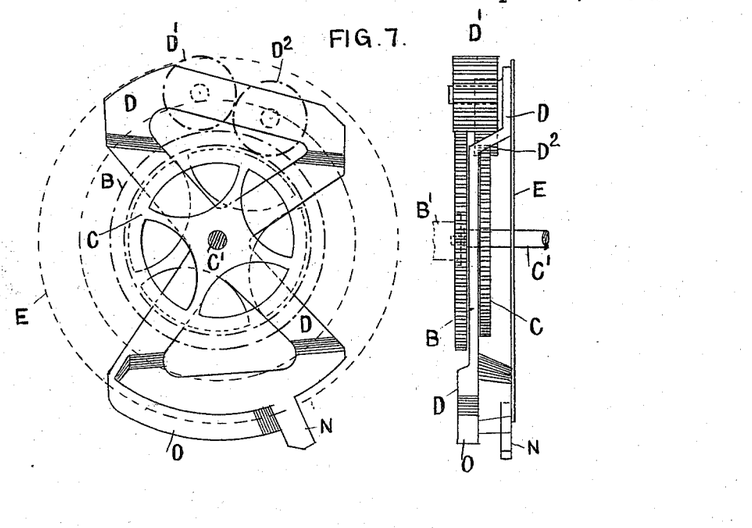
Fig. 7, front and end elevation of epicyclic gearing.

G is a pawl, which, on the insertion of a coin, operates the said ratchet wheel in the following manner: H is a frame in the form of a quadrant (shown best in Fig. 5) mounted on the central spindle B′, and H′ a handle for turning the said frame on its axis. This frame, at its outer end, carries a spindle $h$ on which are mounted the aforementioned pawl G and a weighted lever I, a second pawl G′ being mounted at $g′$. The pawl G is for engaging the ratchet wheel F, and the pawl G′ for a fixed rack J having its teeth facing in the opposite direction to the teeth of the ratchet wheel, both pawls being operated in a similar manner. In their normal positions, the pawls G and G′ are held out of engagement with their respective wheel and rack by a projection $g$ moving with the weighted lever I, and are therefore inoperative, but, if a coin is inserted, it rests partly in a pocket $i$, Figs. 5 and 6, formed in one end of the lever, and partly in the coin slot $a$, and, if the quadrant frame H, carrying the weighted lever and pawls, be moved forward by the handle H′, the coin passes with it under a guide in the form of a groove K in the frame A, and, if it be a coin of the proper size, depresses the weighted lever, causing the pawls to engage, the one with the ratchet wheel F, and the other with the fixed rack J. If the coin be small, it will lie much farther down in the pocket of the weighted lever and not actuate the mechanism.

Figure 8:
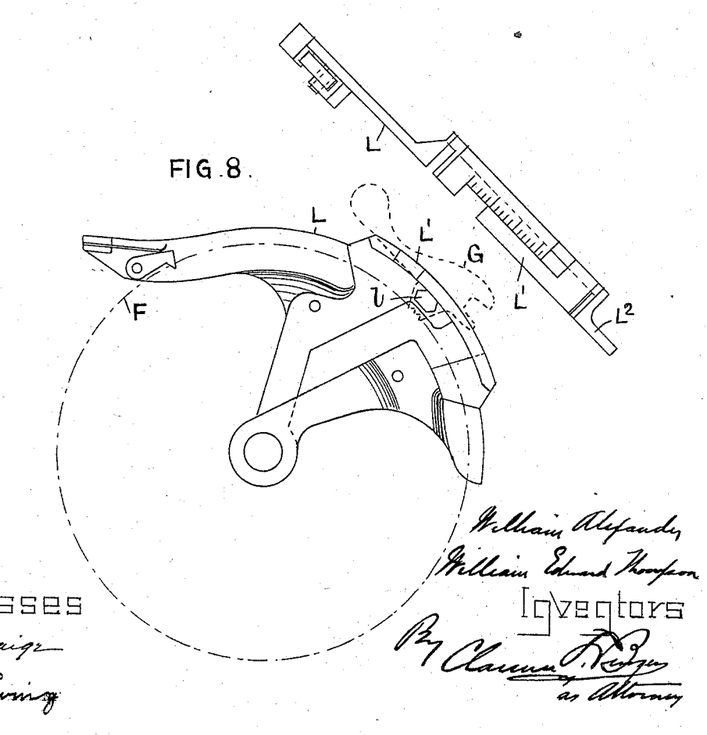
Fig. 8, elevation and plan of guides for pawls.
Figures 9, 10:
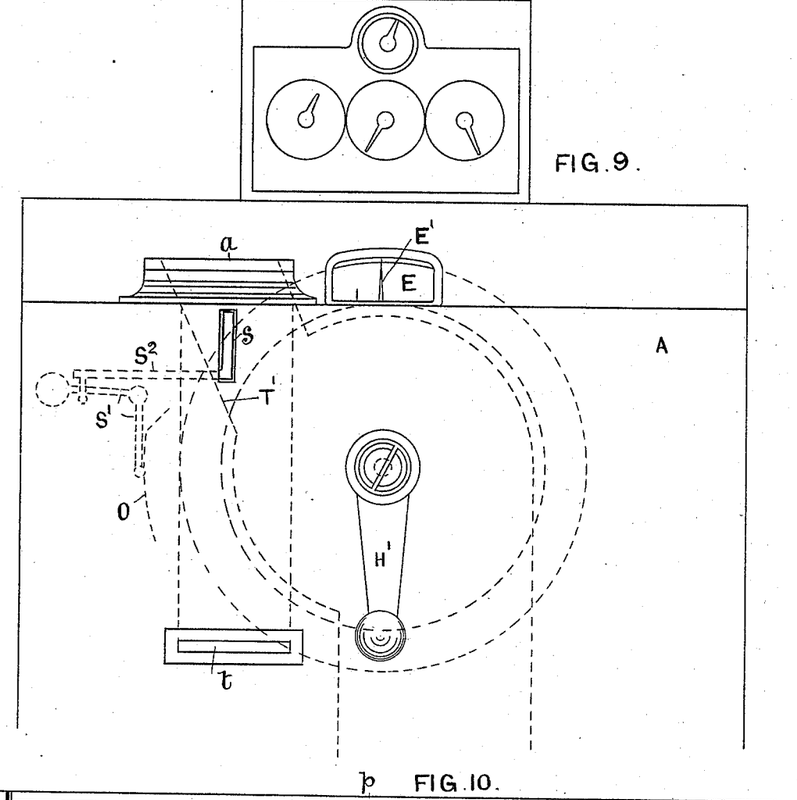
Figure 11:
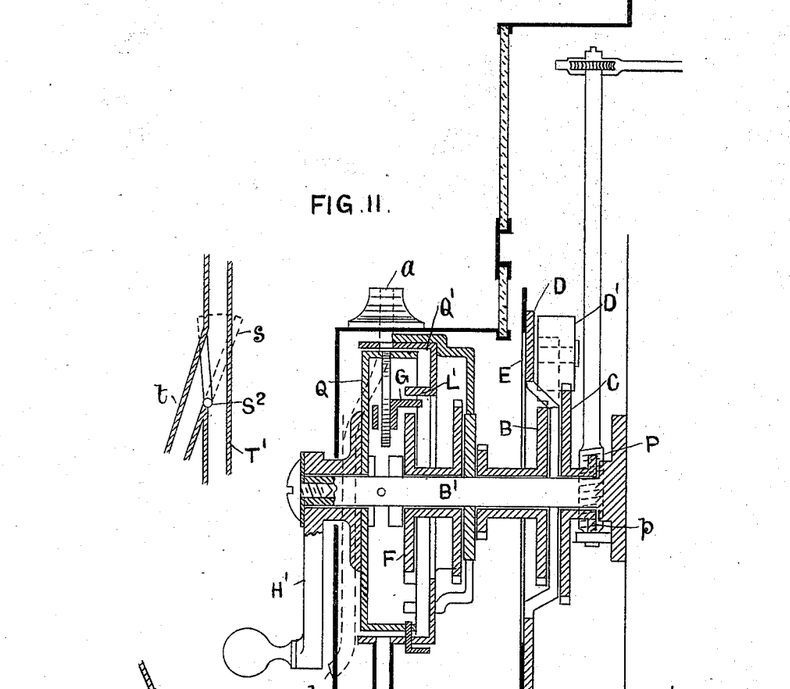
Fig. 11, a vertical section.
Figure 12:
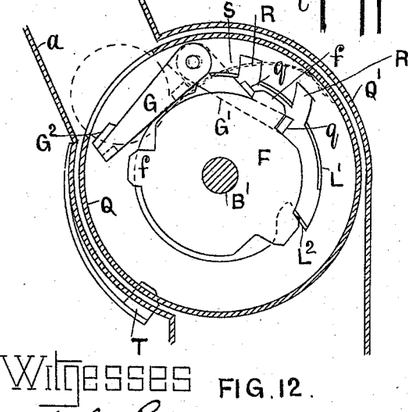
Fig. 12, a sectional view of the coin mechanism showing the coin entering the same.
Figure 13:
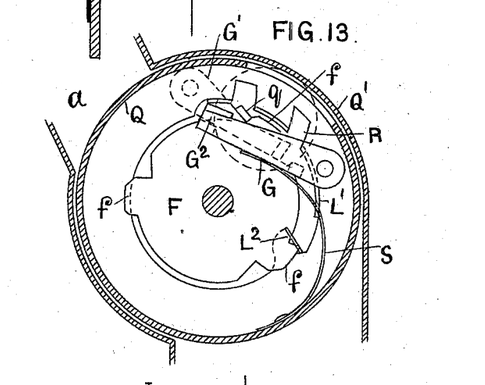
Fig. 13, a similar section illustrating the unlocking of the ratchet wheel.
Figure 14:
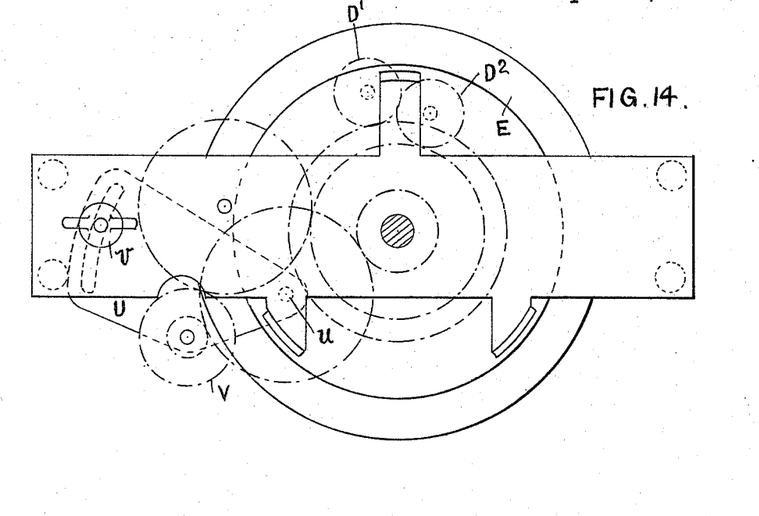
Fig. 14, an elevation of change wheels, and Fig. 15 an elevation of epicyclic gearing.
Figure 15:
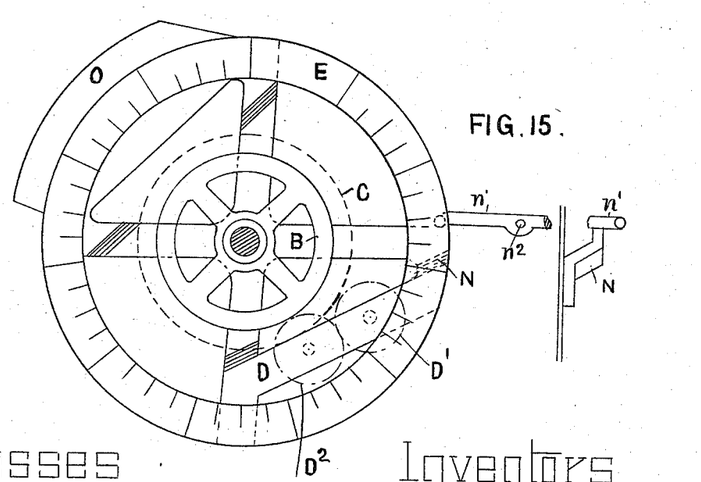

The pawl engaging the ratchet wheel imparts to the dial E (by means of the toothed wheel B and rolling wheel D′) an angular movement in a direction opposite to that in which it moves when driven by the index gearing of the meter, the amount of such angular movement and, consequently, the amount of gas obtainable for each coin inserted, being regulated as follows: The pawl G having a projection $l$, when moved forward, does not engage the ratchet wheel F immediately on the coin coming under the groove K, but rides, by means of its projection, on a fixed projection L until it comes to the end of the latter, when it drops suddenly into engagement with the wheel and forces it round until (its projection $l$ having passed under guides L′, which have kept it in gear) it reaches a second projection $L^2$ which raises it clear of the ratchet wheel. These projections L $L^2$ and guides L′ are shown in plan in Fig. 8, and, as one of them, $L^2$, with its guide, is adjustable in the direction of its length by means of a set screw M′ and curved slot $m$, Fig. 5, it will be evident that the distance between them can be varied, and consequently the pawl will leave the ratchet wheel sooner or later and the dial be moved round a greater or lesser distance according to the distance apart of the said projections. The pawl G′ engaging in the fixed rack prevents the handle being moved backward so long as a coin is in the pocket, but, when the coin falls into the box or receptacle formed to receive it, both pawls are lifted by the weighted lever I clear of the racks and the handle may then be moved back to its original position. On this being done, another coin may be inserted and the process repeated.

N is a nosepiece on the frame D carrying the dial E, which, when the pointer points to zero on the dial, raises the rod $n$, if it be a gas meter, by means of lever $n′$ pivoted at $n^2$ and actuates the valve which shuts off the supply of gas. Should the valve by any possibility stick in its seating, the nosepiece N on rising would strike the arm $n^3$ of the lever $n′$ and force open the said valve.

In order to prevent the complete rotation of the index E by too great a number of coins being inserted successively, which would cause the nosepiece N to be forced on to the back of the valve rod or lever and damage the mechanism, an arm or cam O on the frame D is adapted in its rotation to force a spring actuated pin or bolt $d$, Fig. 2, across the path of the aforementioned frame H which carries the pawls G G′, thus rendering it inoperative until the meter action has carried the cam O in the reverse direction sufficiently far to allow the pin $d$ to spring back clear of the said frame. A somewhat similar bolt or pin can be used in any arrangement for closing the coin slot for the same purpose and forms an improvement in such. In place of causing a portion of a lever or arm to come opposite the slot, the pin or bolt is caused to pass through the sides of the slot or through guides attached so that it cannot be bent or forced aside.

The quadrant-shaped frame H is made to dip, as shown at $H^2$, so that, if a coin be inserted in the slot $a$ after the handle H′ is pushed over, the latter on its return will clear the coin owing to its dropping into the dip, and by this means the length or height of the handle can be reduced. It will be observed that a blank space $e$ is left in the dial E, which, when the meter is not working, is opposite the fixed pointer E′, so that a person can see at a glance that all the gas paid for has been consumed. To prevent persons obtaining gas fraudulently by inserting a piece of wire or the like down the coin slot $a$ and pressing the pawl G on to the ratchet wheel F, a projection $h′$ on the frame H enters the groove K, closing the same.

The mode of action is as follows:—Having first regulated the distance apart of the projections L and $L^2$, so that a given amount of gas will be allowed to pass through the meter for a certain coin, the latter is dropped in the coin slot $a$ and rests in the pocket of the weighted lever I. The handle H′ and frame H are then moved forward, and the pawl G, after riding along the projection L, drops on to the ratchet wheel F, rotating the same until it (the pawl) reaches the second projection $L^2$ and is raised clear of the said ratchet wheel. The coin now leaves the frame H and passes into a receptacle in the meter, when the frame can then be turned back to its first position ready for the next coin that is inserted, when the operation is repeated. The movement of (No Model.)

H. L. BALDWIN.
TELEPHONE TRANSMITTER.

No. 526,139. Patented Sept. 18, 1894.

Witnesses:
Wm. N. Rheem.
Wm. H. ____

Inventor:
Henry L. Baldwin
By L. Hill his Atty